(12) United States Patent
Meek

(10) Patent No.: US 9,004,733 B2
(45) Date of Patent: Apr. 14, 2015

(54) OPTICAL FIBER INSTALLATION TOOL HAVING A PASSIVE ILLUMINATION FEATURE

(71) Applicant: Corning Optical Communications LLC, Hickory, NC (US)

(72) Inventor: David Wayne Meek, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 69 days.

(21) Appl. No.: 13/803,870

(22) Filed: Mar. 14, 2013

(65) Prior Publication Data

US 2013/0265794 A1    Oct. 10, 2013

Related U.S. Application Data

(60) Provisional application No. 61/620,486, filed on Apr. 5, 2012, provisional application No. 61/725,271, filed on Nov. 12, 2012.

(51) Int. Cl.

| | |
|---|---|
| *F21V 7/04* | (2006.01) |
| *G01N 21/00* | (2006.01) |
| *G02B 6/46* | (2006.01) |
| *G02B 6/00* | (2006.01) |
| *G02B 6/38* | (2006.01) |

(52) U.S. Cl.
CPC .. *G02B 6/46* (2013.01); *G02B 6/00* (2013.01); *G02B 6/3802* (2013.01); *G02B 6/3846* (2013.01)

(58) Field of Classification Search
USPC ............................ 385/137; 362/551; 356/73.1
See application file for complete search history.

(56) References Cited

U.S. PATENT DOCUMENTS

| 4,871,227 | A | | 10/1989 | Tilse .......................... 350/96.21 |
|---|---|---|---|---|
| 6,134,371 | A | * | 10/2000 | Yoshida et al. ............... 385/137 |
| 6,377,743 | B1 | * | 4/2002 | Ueda et al. ..................... 385/137 |
| 6,516,131 | B1 | | 2/2003 | Tullis ............................. 385/137 |

(Continued)

FOREIGN PATENT DOCUMENTS

| EP | 0285803 | A2 | 10/1988 | ............... G02B 6/38 |
|---|---|---|---|---|
| EP | 0903599 | A2 | 3/1999 | ............... G02B 6/38 |

(Continued)

OTHER PUBLICATIONS

Corning Cable Systems LLC, Installation Guide for the TKT-UniCam® -PFC-Tool Kit, 006-369, Issue 6, 44 pages.

(Continued)

*Primary Examiner* — Donald Raleigh

(57) ABSTRACT

Disclosed is a passive illumination apparatus for improving the visibility of an optical fiber by projecting reflected light to passively illuminate an optical fiber for allowing the user improved visibility for inserting the optical fiber into an orifice. One embodiment of the concept uses a passive illumination apparatus having a pattern of one or more colors for reflectively transmitting chromatic light along with an optional contrast surface such as a gray or black stripe for providing a highly contrasting background for the user to view the optical fiber against. The ambient light is transmitted or directed from a reflective surface such as a concave curved region for passively illuminating the optical fiber. The passive illumination apparatus may be used on any suitable device such as a connector installation tool, a splicer, a stripper for an optical fiber coating or a cleaver as desired.

5 Claims, 9 Drawing Sheets

(56) References Cited

U.S. PATENT DOCUMENTS

| | | | |
|---|---|---|---|
| 7,116,882 B2 | 10/2006 | Watte et al. | 385/134 |
| 7,680,384 B2 | 3/2010 | Billman et al. | 385/134 |
| 2003/0123836 A1* | 7/2003 | Fujisawa et al. | 385/137 |
| 2010/0316344 A1 | 12/2010 | Bylander et al. | 385/134 |

FOREIGN PATENT DOCUMENTS

| | | | |
|---|---|---|---|
| EP | 1136860 A2 | 9/2001 | G02B 6/38 |
| GB | 2356263 A | 5/2001 | G02B 6/43 |
| JP | 2004-240296 A | 8/2004 | G02B 6/00 |

OTHER PUBLICATIONS

Corning Cable Systems LLC, Product Specification Sheet for UniCam® Connector Installation Tool, TL-UCP-NAFTA-AEN, Mar. 19, 2012, 2 pages.

Patent Cooperation Treaty, International Search Report and Written Opinion for International Application No. PCT/US2013/035125; Mailing Date Jul. 5, 2013—12 pages.

* cited by examiner

OPTICAL FIBER INSTALLATION TOOL HAVING A PASSIVE ILLUMINATION FEATURE

RELATED APPLICATIONS

This application claims the benefit of priority under 35 U.S.C. §119 of U.S. Provisional Application Ser. Nos. 61/620,486 filed on Apr. 5, 2012 and 61/725,271 filed on Nov. 12, 2012, the contents of which are relied upon and incorporated herein by reference in its entirety.

FIELD

The disclosure relates generally to passive illumination of an optical fiber which may be used for improving the visibility of the optical fiber during manual manipulation of the optical fiber by the user into an orifice of a tool, a component or assembly. This disclosure is also generally related to installation tools having passive illumination for inserting a field optical fiber into a structure held in an installation tool such as an orifice of a mechanical splice (i.e., field installable) optical connector.

BACKGROUND

Optical fibers are being used more and more for communication networks for numerous reasons such as large bandwidth and dielectric characteristics. However, it is often necessary to insert the relatively small optical fiber into a tool, a component or assembly for preparing the optical fiber or for termination of the optical fiber. By way of example, optical fiber connectors are used for terminating an optical fiber and providing a connection point that can be reconfigured as desired. In other words, the optical fiber connector allows mating and un-mating of the connector or relocating the connector to a new location. In preparation for insertion of the optical fiber into a connector, a portion of the coating of the optical fiber is usually stripped and/or cleaved before insertion into a connector. The insertion of the optical fiber into a tool, component or connector can be difficult due to the small size and transparent color of the fiber, which can be compared with trying to thread a needle.

One type of optical fiber connector is a mechanical splice connector that allows the craft to make an optical connection in the field rather than having the fiber optic connector mounted on the optical fiber in the factory. Mechanical splice connectors are advantageous since they can allow tailored cable lengths and optimize cable routing and management. An example of mechanical splice connectors designed for field-installation is the UniCam® family of connectors available from Corning Cable Systems LLC of Hickory, N.C.

Mechanical splice connectors require inserting a "prepared" field optical fiber into the rear end of the connector to abut with a stub fiber of the mechanical splice connector. The craft may find it challenging to insert the "prepared" field fiber into a mechanical splice connector, especially in low-light conditions. Moreover, successfully installing a mechanical splice connector requires inserting the field optical fiber into the mechanical connector without damaging the prepared end of the optical fiber by unintended contact with surrounding surfaces that can cause damage or degrade performance. Factors contributing to this challenge include poor visibility of the fiber due to: the optical fiber's small size; the reflectivity of the fiber's surface; the lack of contrast between the fiber and the surfaces around it; and the poor lighting conditions often encountered in the environments where the connector requires installation. One or more of these factors are common in many, if not most field environments. Moreover, poor fiber visibility may impede the user's ability to properly align the optical fiber with critical surfaces and can cause a field installation with a higher insertion loss, require the craft to re-work the end of the optical fiber or cutting off a terminated mechanical splice connector and starting over.

Although, some mechanical splice connectors may be terminated in the field without the use of an installation tool, most users desire the use on an installation tool to aid in the process. Typically, connector installation tools have used black background surfaces to aid the visibility of the optical fiber against the tool during installation. The use of a dark background to improve fiber visibility can be seen in the Corning Cable Systems TL-UC01 installation tool, where a matte black adhesive tape strip is applied to the tool immediately beneath the optical fiber's intended path in the tool and toward the mechanical splice connector. Alternately, some manufacturers have used supplemental lighting such as work lights integrated into the tool for improving the visibility of bare optical fiber during installation. For instance, work lights are used in many fusion splicers so the craft has improved visibility of the optical fiber and work piece. However, these work lights require power, increase the equipment size and/or weight, introduce maintenance requirements, and have other drawbacks.

Thus, there is an unresolved need for improved fiber visibility in tools and the like for aiding the craft when handling and manipulating optical fibers.

SUMMARY

The disclosure is directed to a passive illumination apparatus for improving visibility of an optical fiber including a trough with at least a portion of the trough having a reflective surface suitable for reflectively transmitting light toward an insertion axis. The reflectively transmitted light is configured for being received by an optical fiber disposed along the insertion axis and causing the optical fiber to illuminate for improving visibility. The trough may have any suitable shape and in further embodiments the trough may include a contrast surface.

The disclosure is also directed to an installation tool for terminating an optical fiber to a mechanical splice connector including a carriage for holding the mechanical splice connector so it is aligned with an orifice region of the tool, and a passive illumination apparatus for improving visibility of the optical fiber associated with the installation tool. The passive illumination apparatus including a trough with at least a portion of the trough having a reflective surface suitable for reflectively transmitting light having a wavelength in the visible spectrum, where the reflectively transmitted light is configured for being received by the optical fiber disposed along an insertion axis and causing the optical fiber to illuminate for improving visibility. The reflective surface is portion of an applique such as a decal, insert, ink stamp, printing or sticker or the reflective surface may be integrally formed with the trough. The trough may have any suitable shape and in further embodiments the trough may also include a contrast surface.

The disclosure is further directed to a method of passively illuminating an optical fiber for insertion into an orifice, the method including providing a trough with at least a portion of the trough having a reflective surface for reflectively transmitting light toward an insertion axis, placing the trough in proximity to the orifice with a focal region being in general axial alignment to the orifice. The method also includes moving the optical fiber proximal to the trough and within the focal region where the reflectively transmitted light illuminates the optical fiber, and inserting the illuminated optical fiber into the orifice.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
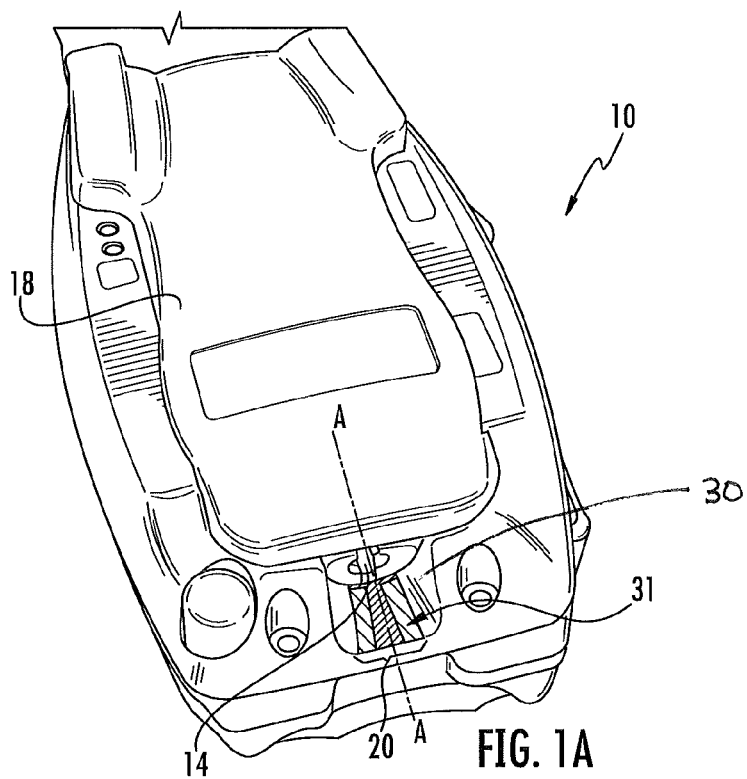
FIGS. 1A-1E depict an explanatory embodiment of an installation tool that includes a passive illumination apparatus.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Figure 4:
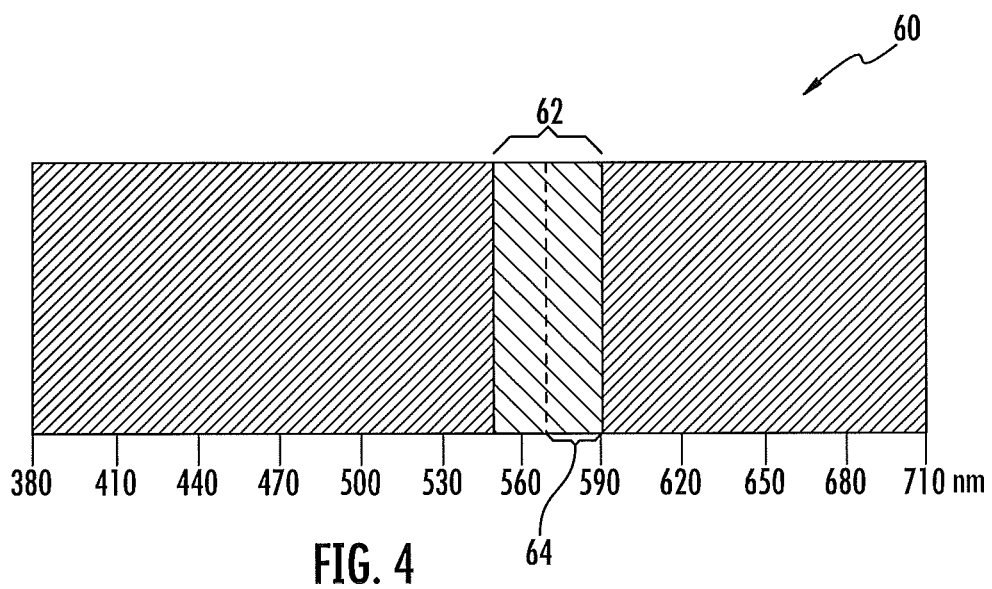
FIG. 4 is a representation of the spectrum of light visible to the human eye (i.e., chromatic light)

Disclosed is a passive illumination apparatus for projecting reflected light to passively illuminate an optical fiber, making it more visible against an optional contrast surface and thus allowing the user improved visibility of the optical fiber for inserting an optical fiber into a device such as an installation tool for a mechanical splice connector with more ease. One embodiment of the concept uses a passive illumination apparatus having a reflective surface of one or more colors for reflectively transmitting chromatic light (i.e., light visible to the human eye having a color in the range of about 380 nm to 710 nanometers such as represented in FIG. 4) toward an insertion axis along with an optional contrast surface such as a gray or black stripe as desired for providing a highly-contrasting background for the user to view the optical fiber. The applied color of the reflective surface is preferably disposed on a concave curved region and has a relatively high-gloss surface finish for allowing as much light as possible to be reflected off the surface and thus collected or directed to the optical fiber disposed along the insertion axis; however, any suitable surface may be used for the reflective surface as desired. Stated another way, the ambient light is collected or directed from the reflective surface of the passive illumination apparatus for reflectively transmitting the light toward an insertion axis of the passive illumination apparatus. Consequently, this passively illuminates the optical fiber disposed along the insertion axis and gives it the appearance of whatever color is used as part of the passive illumination apparatus. For example, if the reflective surface has a yellow color then the optical fiber will also appear to have a yellow tone when passively illuminated. By passively increasing fiber visibility for the user, the likelihood of damage to prepared (i.e., stripped and cleaved) optical fibers caused by users missing the field fiber entry point (i.e., orifice) of a device such as a connector during installation is reduced. Likewise, damage and/or contamination of the stub fiber of the mechanical splice connectors may also be reduced. Thus, the concepts disclosed are advantageous since they can reduce installation and/or re-work time and provide the user with a more positive installation experience.

The concepts disclosed herein are applicable to a variety of tools or devices associated with optical fibers. Although, one embodiment describes the passive illumination apparatus in connection with an installation tool for a connector such as a mechanical splice connector, the passive illumination apparatus could be integrated into any tool where fiber visibility using passive illumination is desired such as a splicer, coating stripper or a cleaver such as generically depicted in FIG. 2B as a tool 100.

Figure 1B:
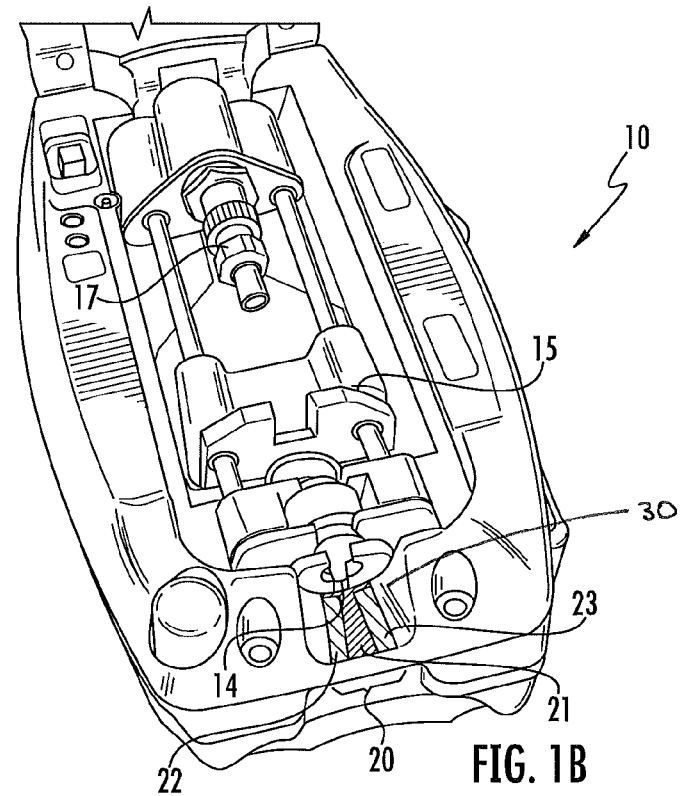
Figure 1C:
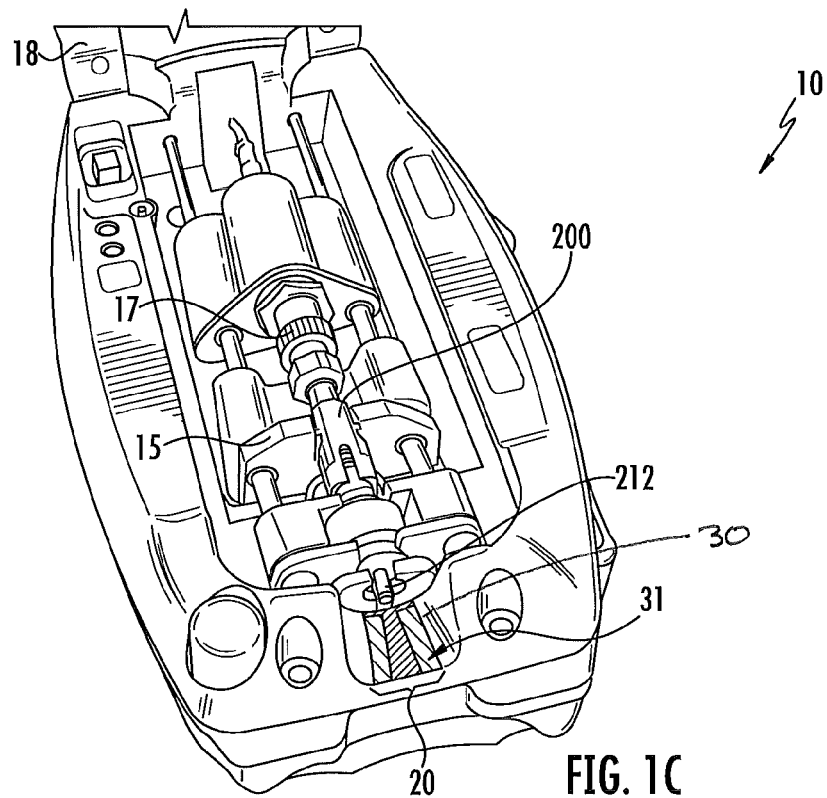
Figure 1D:
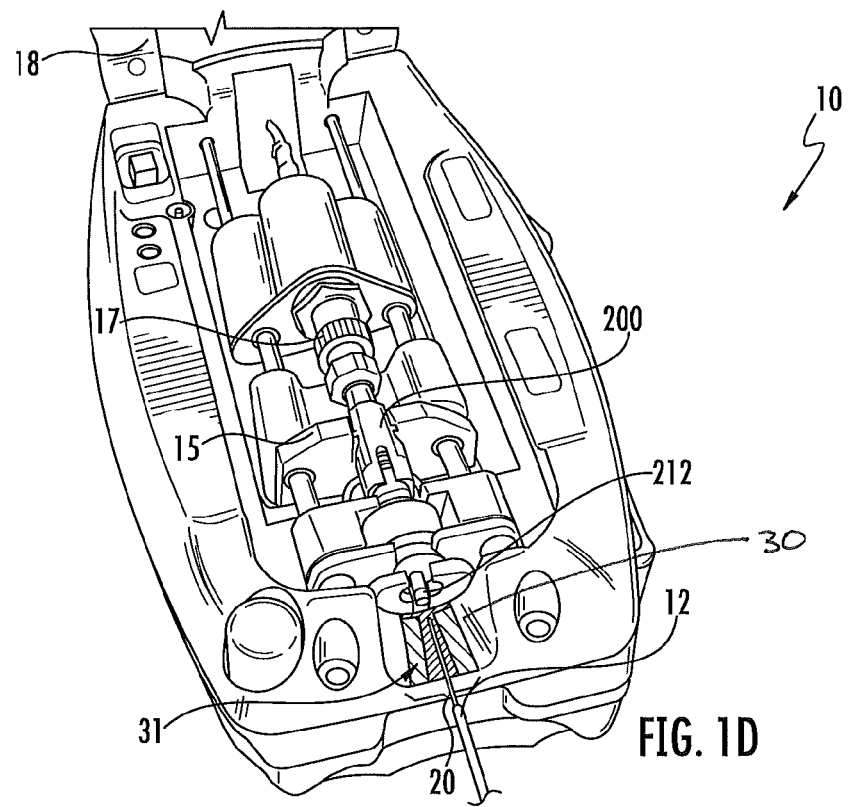
Figure 1E:
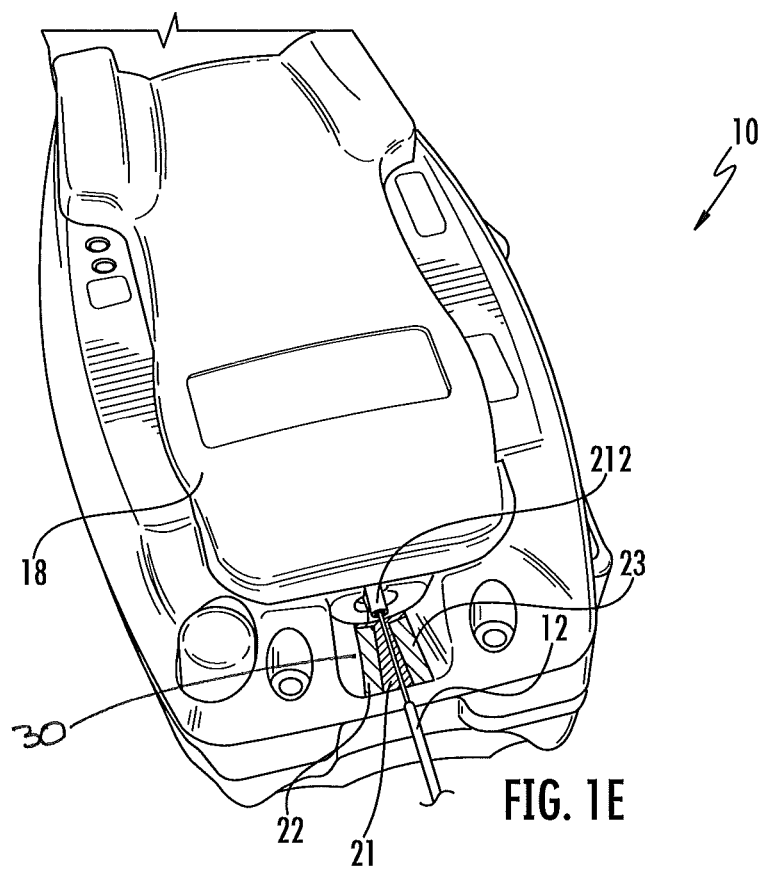

FIGS. 1A-1E depict a series of images for an explanatory installation tool 10 used for terminating an optical fiber 12 in a mechanical splice connector 200. FIG. 1A shows installation tool 10 having a passive illumination apparatus 20 in proximity to an orifice region 14 of the tool for aligning the optical fiber therewith for insertion into a device such as connector 200 or the like. Although installation tool 10 shown is intended for a UniCam connector the concepts of a passive illumination apparatus for inserting the illuminated optical fiber into an orifice region by axially translating the fiber along the insertion axis may be used with any suitable connector tool. FIGS. 1A and 1E show a cover 18 of installation tool 10 in a closed position as would be in used in normal operation during insertion of an optical fiber 12 into connector 200 and FIGS. 1B-1D show the cover 18 of installation tool 10 in an open position to show details of the tool and loading of the connector 200. As best shown in FIG. 1B, installation tool 10 includes a carriage 15 that slides on rails (not numbered) along with an adapter 17 (also disposed on the rails) that forms a portion of a visual fault locator (VFL) that transmits visible light to the mechanical splice that occurs between optical fiber 12 and a stub fiber disposed within connector 200. Details of a similar installation tool are disclosed in U.S. Pat. No. 7,680,384, the contents of which are incorporated herein by reference.

During use, the cover 18 is opened and the mechanical splice connector 200 is disposed within a carriage 15. The carriage 15 is used for holding the mechanical splice connector 200 in alignment with an orifice region 14 of tool 10 for receiving a portion of optical fiber 12. Thereafter, the adapter 17 is slid into position so that light from the VFL (i.e., a laser or laser diode) may be transmitted to the stub fiber disposed within a ferrule of connector 200 as best shown in FIGS. 1C and 1D. As shown, installation tool 10 includes a passive illumination apparatus 20 near the orifice region 14 of the tool (which is in proximity to the orifice 212 of the connector 200 in this case) for improving the visibility of the optical fiber 12 being inserted into the mechanical splice connector 200 that is aligned with an insertion axis A of the tool 10 and the connector 200 (FIGS. 1A and 1C). More specifically, connector 200 includes an orifice 212 at the rear portion of the connector for receiving optical fiber 12 into connector 200. As shown in FIG. 1E, when connector 200 is held by carriage 15 the orifice 212 extends into and past the orifice region 14 when the cover 18 is in the closed position.

FIG. 1B shows passive illumination apparatus 20 including a trough (not numbered) with at least a portion of the trough having a reflective surface arranged as a first region 22 and a second region 23 (that are divided by a contrast surface 21) suitable for reflectively transmitting light that is used for improving visibility of the optical fiber 12 being inserted into the orifice region 14 associated with tool 10. Passive illumination apparatus 20 may be an applique or integrally formed with the tool as desired. By way of example, the applique may be a decal, an insert, an ink stamp, a printing, or a sticker on the tool as desired. Alternatively, the passive illumination apparatus 20 may be integrally formed in the tool such as molded into a portion of the tool if desired. In this embodiment, installation tool 10 has trough 30 formed therein such as molded in the body with the passive illumination apparatus 20 disposed thereon as an applique applied on the trough 30 so as to include the one or more reflective surfaces 22,23 for reflectively transmitting light toward insertion axis A that is used for improving visibility of the optical fiber 12 being inserted into the orifice 212 of connector 200 that is associated with installation tool 10.

Specifically, the reflectively transmitted light from the reflective surface is configured for being received by optical fiber 12 disposed along the insertion axis A causing the optical fiber 12 to illuminate and improve visibility. FIGS. 1D and 1E show optical fiber 12 that was prepared by first stripping the fiber coatings and then cleaved to the proper length being inserted into orifice 212 of the connector 200 that is in proximity to passive illumination apparatus 20, respectively, with cover 18 in the open and closed positions for reference and understanding. In this embodiment, the passive illumination apparatus 20 is formed on trough 30 that is part of installation tool 10 and shaped as a concave curved region 31 in this embodiment, but other suitable shapes are possible for trough 30 according to the concepts disclosed herein.

Figure 5A:
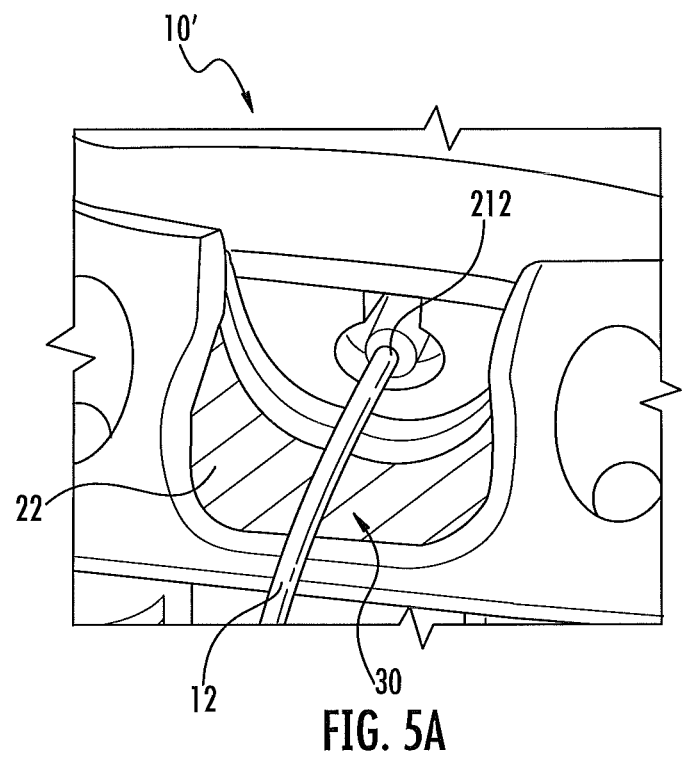
FIGS. 5A and 5B are respectively detailed and perspective views showing an optical fiber inserted into a connector within another installation tool similar to the installation tool of FIGS. 1A-1E.
Figure 5B:
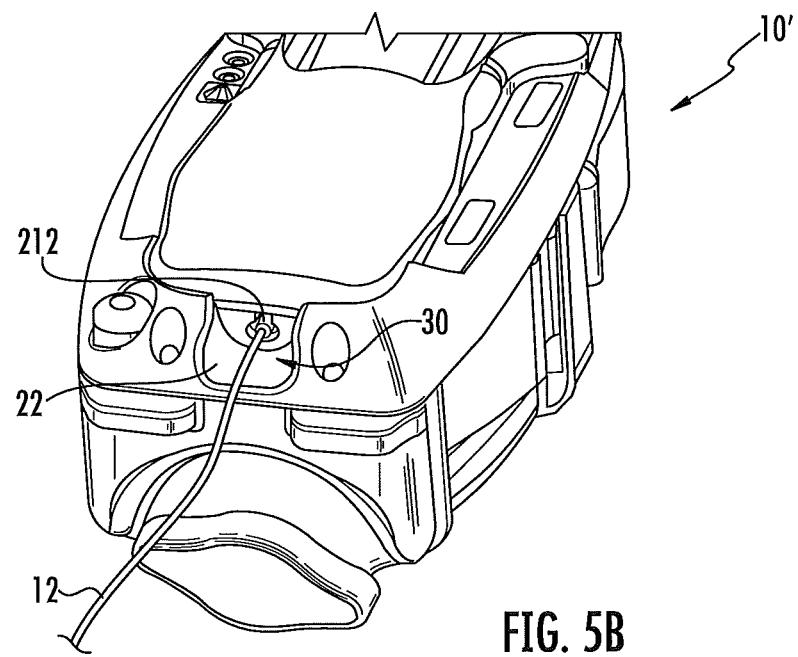

Additionally, the embodiment of passive illumination apparatus 20 shown on installation tool 10 also includes an optional contrast surface 21. Contrast surface 21 is, for example, unsuitable or less than suitable for reflectively transmitting light to the same intensity as the one or more reflective surfaces 22,23 so that the optical fiber has a high contrast to surface 21 when illuminated and viewed against this surface for further aiding the user in viewing optical fiber 12 (i.e., improved visibility against the background) for insertion of the optical fiber 12 into the orifice region 14/orifice 212. As shown, passive illumination apparatus 20 has contrast surface 21 that divides the reflective surface into a first region 22 and a second region 23. In other words, the contrast surface 21 is disposed on a bottom surface of trough 30. Further, the contrast surface 21 may have a wide end 21w and a narrow end 21n, with the narrow end, in some embodiments, being proximal to the orifice such as shown in FIG. 2B. Consequently, the taper in the contrast surface 21 acts as a guide for aligning the optical fiber 12 into the orifice as it approaches the orifice since the craft can keep optical fiber 12 positioned over the contrasting surface 21. Further, the illuminated optical fiber 12 may be brighter near the narrow end 21n of the contrast surface than at the wide end 21w of the contrast surface. This is effected by, for example, the amount of light being reflected to the focal region 46 or the focal point 42 as illustrated in FIG. 3B. Embodiments of the passive illumination apparatus 20 without the optional contrast surface 21 are also possible according to the concepts disposed such as depicted by installation tool 10' depicted in FIG. 5A.

Figure 2A:
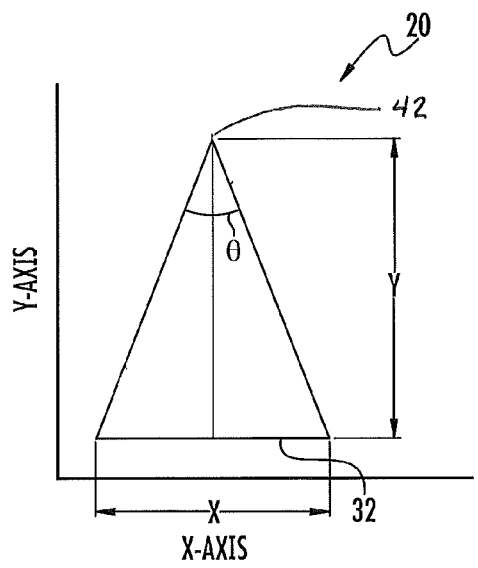
FIG. 2A is a schematic representation of a passive illumination apparatus to the concepts disclosed herein.
Figure 2C:
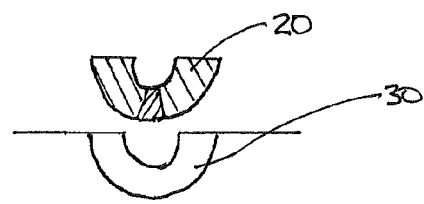
FIG. 2C is a schematic representation of a passive illumination apparatus configured as an applique according to the concepts disclosed herein.
Figure 2B:
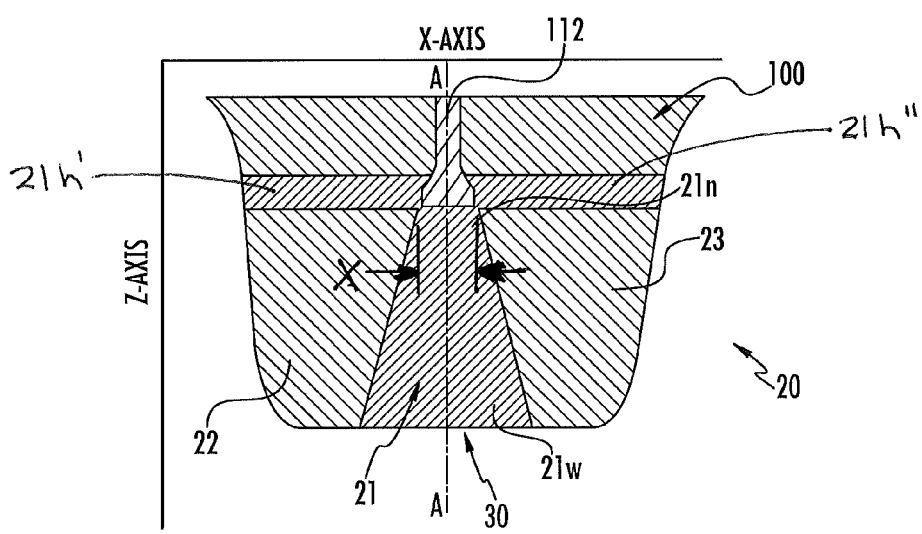
FIG. 2B is a schematic representations of a passive illumination apparatus arranged on a generic tool according to the concepts disclosed herein.

FIGS. 2A-2C are schematic representations of the passive illumination apparatus 20. FIGS. 2A and 2B show explanatory geometry for passive illumination apparatus 20 and FIG. 2C shows passive illumination apparatus 20 configured as an applique having a given shape for application on trough 30 of a tool according to the concepts disclosed. As shown in FIG. 2A, passive illumination apparatus 20 has a length Y and a width X along with a depth that is not visible in this 2-D representation with a desired shape for the given application. As shown, one or more of the dimensions of the passive illumination apparatus may vary along its axis for fitting to at least a portion of a suitable trough 30. The applique/trough have complementary shapes for the given depth, length and width with a desirable shape for the given application. In one embodiment, at least a portion of the applique is suited for the trough 30 having a concave curved. The concave curved region may have an associated focal region along at least a portion of the length with the focal region being in proximity to the installation tool and in general axial alignment with an insertion axis A.

With continuing reference to FIG. 2A, the width X of the contrasting surface at the base of the trough directly below the connector orifice may be derived from the formula $2H*\tan(\theta/2)=X$, where H is the distance from the base (i.e., front) of the trough to the connector orifice 212 (i.e., lead-in of the connector) which also defines focal point 42, $\theta$ is the angle at which maximum light is transmitted (i.e., reflected) into an optical fiber based on the geometry of the trough. The width of the black stripe at the entry to the lead-in is arbitrary and is wider to help the user guide a fiber into a connector. By having the entry wider than the width at the base of the connector the fiber appears less illuminated but brightens up as the fiber approaches the connector. This provides user assistance for aligning the optical fiber in the Y-axis as well as the X-axis.

Other dimensions and/or shapes are possible for the contrast surface as desired for the orifice region geometry and fiber positioning needs of the application. One or more optional horizontal stripes $21h'$, $21h''$ may be placed at the end of the lead-in $21n$ for providing better visibility of the connector orifice 212. Any color is acceptable as the highlighting color for reflective surfaces 22, 23 and the preferred contrasting surface center stripe should be black or gray, but other suitable dark colors are possible. FIG. 4 shows the full spectrum of light visible to the human eye and identifies color ranges 62 and 64 that are highly visible and reflective.

As schematically depicted in FIG. 2B, passive illumination apparatus 20 includes reflective surfaces 22,23 suitable for reflectively transmitting light along with contrast surface 21 that is used for improving visibility of the optical fiber 12 being inserted into the orifice 112 associated with a generic tool 100 as discussed above. By way of example, the contrast surface 21 may be configured as a center stripe at the base of the connector (i.e., bottom of the trough 30) with the narrow end $21n$ having any suitable width X. In one example, the narrow end $21n$ has a width of about 0.089 inches with the width of the contrast surface 21 expanding towards the beginning of the first end 32 of the trough 30 (i.e., the lead-in). The size of this example is based on experimental data that suggests that the width of the contrasting stripe is directly related to the height of the placement of the optical fiber in the given tool. With respect to the High Performance UniCam Installation tool, available from Corning Cable Systems, Hickory N.C., for example, is designed such that when inserting a fiber into a mechanical splice connector the fiber has a maximum illumination when it is positioned about 0.15 inches above the trough of the installation tool.

Figure 3A:
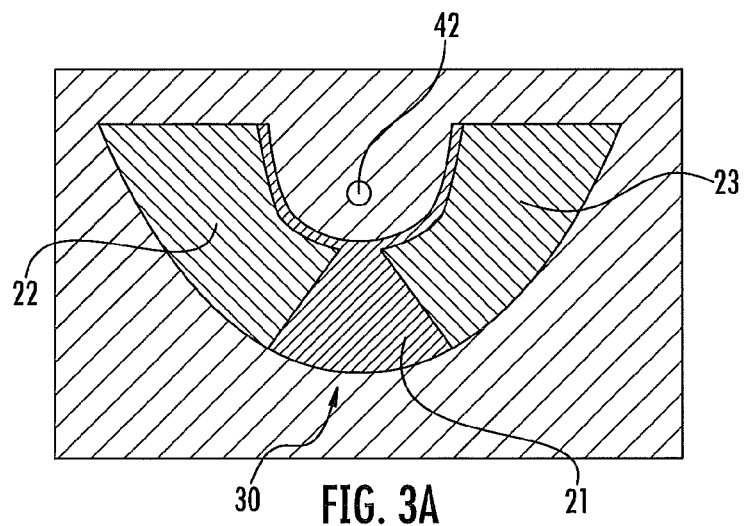
FIGS. 3A and 3B respectively are schematic drawings of a concave curved region such as a parabolic shape of a passive reflective surface and a schematic showing reflected light from the concave curved region.
Figure 3B:
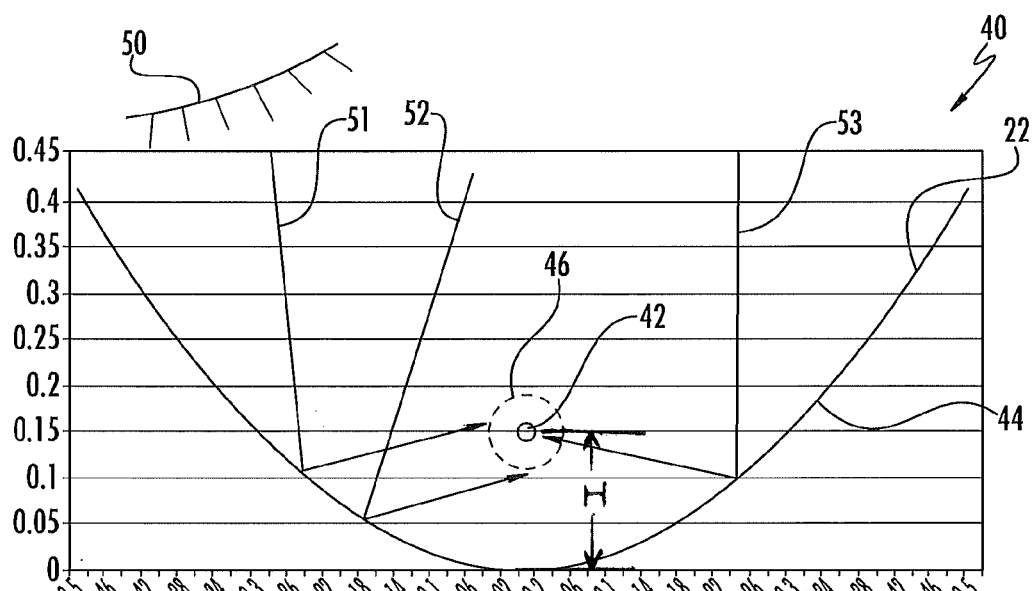

FIGS. 3A and 3B respectively are schematic drawings of a concave curved region used for the trough of the passive illumination apparatus and a schematic showing reflected light from the concave curved region. One example of a concave curved region is a trough having a parabolic shape for at least a portion of the reflective surface. Specifically, FIG. 3A is a schematic example of one proposed shape and pattern for passive illumination apparatus. In exemplary embodiments, at least a portion of the concave curved region may have for example, a parabolic shape with a focal point 42 within the focal region 46. The trough 30 associated with a tool such as the connector installation tool is covered in two contrasting colors. The lighter color is used as a reflective surface 22,23 suitable for reflectively transmitting light toward an insertion axis generally disposed along a focal region 46 and/or focal point 42 and the darker of the two colors is placed along the center or bottom of trough as a guide to help fiber visibility as a contrast surface 21 when the optical fiber is viewed from above. A partial parabolic geometry may be added to increase and focus the amount of light being reflected into the optical fiber.

FIG. 3B is schematic representations of specific cross-sectional geometry having a concave curved region for a portion 40 of trough 30. Specifically, curve 44 represents a reflective surface 22 with the bottom of the curve 44 having a parabolic shape for reflecting light 51-53 toward focal region 46 and/or focal point 42 that is aligned with the orifice of a structure such as an orifice 212 (i.e., crimp tube) of the connector 200. This geometry may be based on the parabolic equation that states, $X*X=4HY$, where X is the distance along the X axis, Y is the distance along the Y axis, and H is the distance from the focal point to the X axis. By way of example, the embodiment of FIG. 3A has, for example, a cross-section with a parabolic bottom with sloping sides that are not parabolic while the graph demonstrates a portion 40 of a parabolic curve that may be used at a given cross-section of the trough.

Of course, other shapes are possible and may be influenced by the aesthetic considerations or design constrains such as a size or functionality of the tool. Further, the use of compound surfaces are also possible using the concepts disclosed herein. For instance, a trough may have a partial parabolic shape on the sides with a flat or round bottom.

As an example, if a parabolic geometry is used it may be such that a focal point 0.15 inches (i.e., H=0.15 inches) from the X-axis determines the shape of the parabolic curve. Using the equation $X*X=0.6Y$ to define the shape of the parabolic curve gives the geometry a focal point at 0.15 inches from the X-axis. Ideally the trough region of the tool would maintain this parabolic shape until it transitioned to the top surface of the tool; however, there may be design constraints or aesthetic criteria that limit the X-axis length of the parabolic shape. For example, the trough may have a compound surface such as a parabolic shape for a portion of the trough such as for a width of one inch or less of the trough and then trough transitions to an angled wall to the top surface of the tool since the width may be limited in size due to design constraints and/or aesthetic purposes. Thus, the compound surface still provides suitable fiber illumination according to the concepts disclosed.

In further embodiments, the tool or device having the passive illumination apparatus 20 or tool may further include an active light source 50 for providing a light such as represented in FIG. 3B. By way of example, in the event of low ambient light the active light source 50 may cast light upon the reflective surface 22 of the passive illumination apparatus 20 for further reflectively illuminating the optical fiber disposed in the focal region 46. In other embodiments, it may be contemplated that the trough 30 itself is illuminated and will actively cast light upon the optical fiber such as by using a LED or other suitable active light source.

FIG. 4 is a representation of the spectrum of light visible to the human eye from about 380 nanometers (i.e., violet) to about 710 nanometers (i.e., red). In preferred embodiments, the reflective surface has a color in the wavelength range of about 500 nanometers (nm) to about 700 nm, wherein the reflectively transmitted light is transversely received by the optical fiber causing the optical fiber to passively illuminate. In other embodiments, the reflectively transmitted light may have a wavelength within the range 62, which is from 550 nm to 590 nm. And in yet other embodiments, the reflectively transmitted light from the reflective surface has a wavelength in the range 64, which is from 570 nm to 590 nm, and being visible as a yellow color. Yellow is a bright color and is highly sensitive to the human eye; however, any other suitable colors in the range should be theoretically interchangeable with yellow.

Figure 6A:
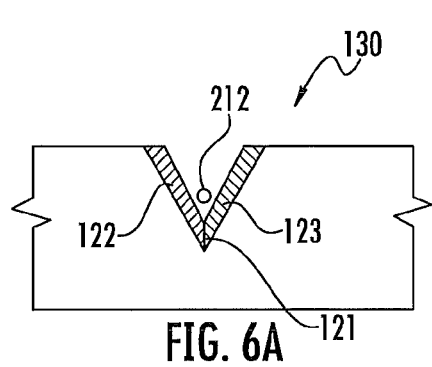
FIGS. 6A and 6B are respective schematic front and top views of an alternate embodiment of a passive illumination apparatus.
Figure 6B:
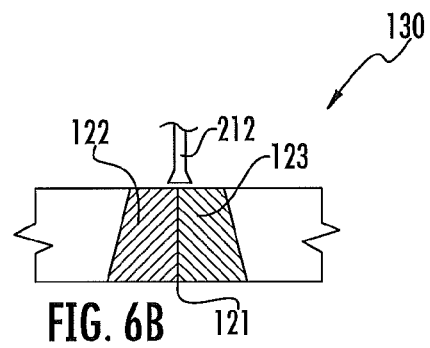
Figure 7A:
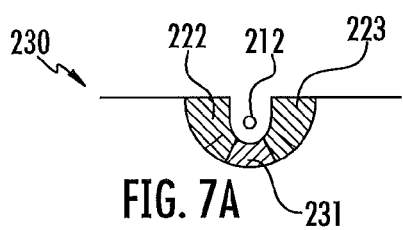
FIGS. 7A and 7B are respective schematic front and top views of another alternate embodiment of a passive illumination apparatus.
Figure 7B:
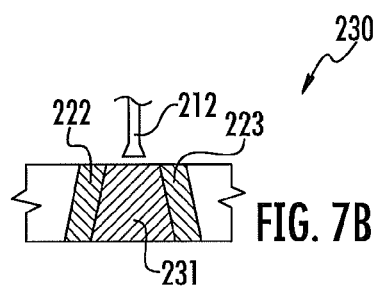
Figure 8A:
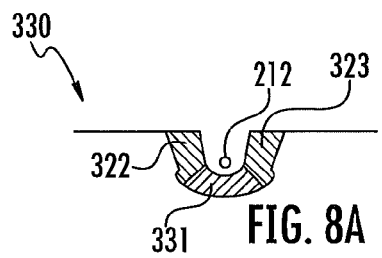
FIGS. 8A and 8B are respective schematic front and top views of yet another alternate embodiment of a passive illumination apparatus.
Figure 8B:
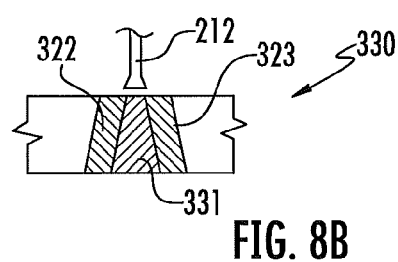
Figure 9A:
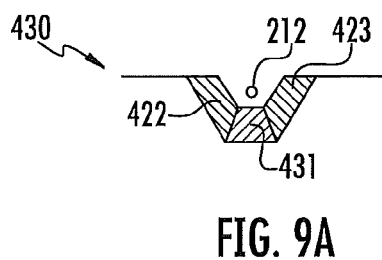
FIGS. 9A and 9B are respective schematic front and top views of yet another alternate embodiment of a passive illumination apparatus.
Figure 9B:
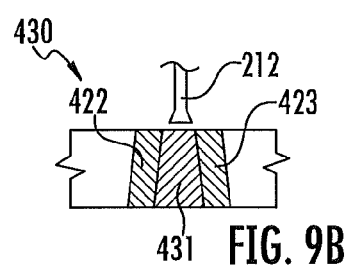
Figure 10A:
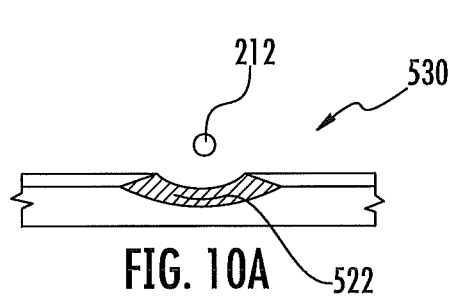
FIGS. 10A and 10B are respective schematic front and top views of yet another alternate embodiment of a passive illumination apparatus.
Figure 10B:
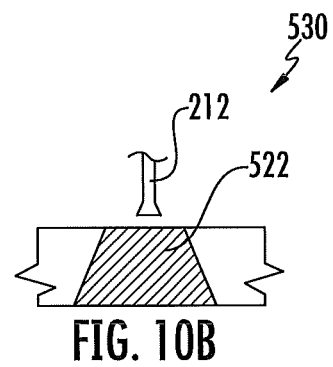
Figure 11A:
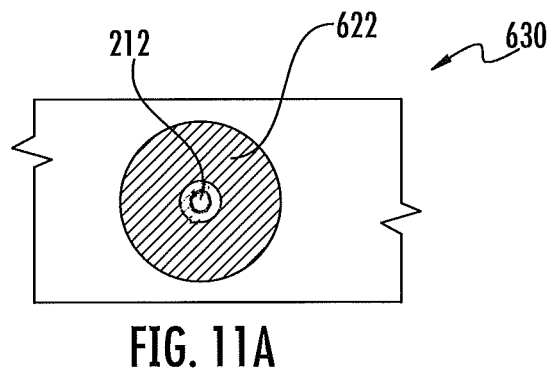
FIGS. 11A and 11B are respective schematic front and side views of yet another alternate embodiment of a passive illumination apparatus.
Figure 11B:
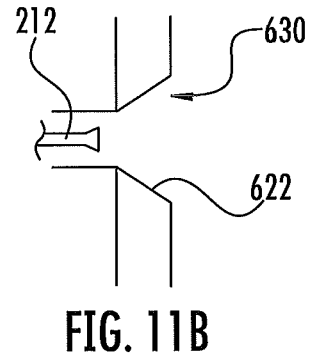

Of course other suitable shapes for the trough may be used with the concepts disclosed herein such as depicted in representative schematic front and top views of FIGS. 6A-11B showing an orifice 212 of connector 200 aligned in the trough. FIGS. 6a and 6B show a passive illumination apparatus having at least a portion of the trough 130 having a V shaped cross-section with reflective surfaces 122,123 and a contrast surface 121. FIGS. 7A and 7B show another passive illumination apparatus having at least a portion of the trough 230 having a U shaped cross-section with reflective surfaces 222, 223 and a contrast surface 231. FIGS. 8A and 8B show another passive illumination apparatus having at least a portion of the trough 330 having flat portions with reflective surfaces 322,323 and a contrast surface 331. FIGS. 9A and 9B show another passive illumination apparatus with a trough configured as a compound surface, specifically, at least a portion of the trough 430 having an open trapezoidal shape with reflective surfaces 422,423 and a contrast surface 431 with a flat, sloped shape. At least a portion of the trough is a recessed region. FIGS. 10A and 10B show another passive illumination apparatus having at least a portion of the trough 530 having a conic section with reflective surface 522. FIGS. 11A and 11B show another passive illumination apparatus having at least a portion of the trough 630 having an annular section with reflective surface 622.

A method of passively illuminating an optical fiber for insertion into an orifice may include the steps of: providing a trough with at least a portion of the trough having a reflective surface for reflectively transmitting light to an insertion axis or focal region; placing the trough in proximity to an orifice with the focal region being in general axial alignment to the orifice; moving the optical fiber proximal to the trough and within the focal region; and inserting the illuminated optical fiber into the orifice. In exemplary embodiments, the method may further include the step of viewing the illuminated optical fiber in alignment to, for example, a contrast region, the contrast region being unsuitable for reflectively transmitting light, further enhancing the visibility of the illuminated optical fiber. In one embodiment, the orifice may be a portion of a fiber optic connector. In another embodiment the trough is part of an installation tool operable for terminating the optical fiber to a mechanical splice connector.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An installation tool for terminating an optical fiber to a mechanical splice connector, comprising:
    a carriage for holding the mechanical splice connector so it is aligned with an orifice region of the tool; and
    a passive illumination apparatus for improving visibility of the optical fiber associated with the installation tool, the passive illumination apparatus comprising:
        a trough with at least a portion of the trough having a reflective surface suitable for reflectively transmitting light having a wavelength in the visible spectrum,
        wherein the reflectively transmitted light is configured for being received by the optical fiber disposed along an insertion axis and causing the optical fiber to illuminate for improving visibility.

2. The installation tool of claim 1, wherein the reflective surface is a portion of applique or integrally formed.

3. A method of passively illuminating an optical fiber for insertion into an orifice, the method comprising the steps of:
    providing a trough with at least a portion of the trough having a reflective surface for reflectively transmitting light toward an insertion axis;
    placing the trough in proximity to the orifice, with a focal region being in general axial alignment to the orifice;
    moving the optical fiber proximal to the trough and within the focal region, wherein the reflectively transmitting light illuminates the optical fiber; and
    inserting the illuminated optical fiber into the orifice.

4. The method of claim 3, the orifice being part of a fiber optic connector.

5. The method of claim 3, the trough being part of an installation tool operable for terminating the optical fiber to a mechanical splice connector.

\* \* \* \* \*